(12) United States Patent
Watanabe et al.

(10) Patent No.: US 8,980,110 B2

(45) Date of Patent: Mar. 17, 2015

(54) METHOD OF MANUFACTURING LIQUID EJECTION HEAD AND METHOD OF PROCESSING SUBSTRATE

(71) Applicant: Canon Kabushiki Kaisha, Tokyo (JP)

(72) Inventors: Masahisa Watanabe, Yokohama (JP); Kazuhiro Hayakawa, Inagi (JP); Toshiyasu Sakai, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/760,860

(22) Filed: Feb. 6, 2013

(65) Prior Publication Data

US 2013/0206723 A1 Aug. 15, 2013

(30) Foreign Application Priority Data

Feb. 14, 2012 (JP) ................................ 2012-029377
Jan. 18, 2013 (JP) ................................ 2013-007103

(51) Int. Cl.
*G11B 5/127* (2006.01)
*B41J 2/16* (2006.01)

(52) U.S. Cl.
CPC .............. *B41J 2/1628* (2013.01); *B41J 2/1603* (2013.01); *B41J 2/1631* (2013.01); *B41J 2/1632* (2013.01); *B41J 2/1635* (2013.01); *B41J 2/1639* (2013.01); *B41J 2/1643* (2013.01)
USPC .................... 216/27; 216/38; 216/41; 216/67

(58) Field of Classification Search
CPC ............ B41J 2/16; B41J 2/162; B41J 2/1621; B41J 2/1626; B41J 2/1628; B41J 2/1629; B41J 2/1631
See application file for complete search history.

(56) References Cited

U.S. PATENT DOCUMENTS

| | | | | |
|---|---|---|---|---|
| 6,273,557 | B1 | 8/2001 | Milligan et al. | |
| 6,332,669 | B1 | 12/2001 | Kato et al. | |
| 6,534,247 | B2 | 3/2003 | Milligan et al. | |
| 2006/0030503 | A1* | 2/2006 | Minamihaba et al. | 510/175 |
| 2007/0159514 | A1* | 7/2007 | Park et al. | 347/68 |
| 2008/0020570 | A1* | 1/2008 | Naik | 438/675 |
| 2010/0134560 | A1* | 6/2010 | Doi et al. | 347/47 |
| 2011/0300648 | A1* | 12/2011 | Minami | 438/21 |

FOREIGN PATENT DOCUMENTS

JP 11-320873 A 11/1999

* cited by examiner

*Primary Examiner* — Lan Vinh
*Assistant Examiner* — Jiong-Ping Lu
(74) *Attorney, Agent, or Firm* — Fitzpatrick, Cella, Harper & Scinto

(57) ABSTRACT

A liquid ejection head includes a substrate having an ejection energy generating element formed at a first surface side thereof, a common liquid chamber formed at a second surface of the substrate, and a liquid supply port extending from the bottom of the common liquid chamber to the first surface. The liquid ejection head is manufactured by preparing a substrate having the common liquid chamber formed at the second surface side, then arranging a material to be filled in the common liquid chamber, subsequently forming an aperture in the filled material as corresponding to the liquid supply port to be formed, and thereafter forming the liquid supply port by reactive ion etching, using at least the filled material as a mask.

12 Claims, 4 Drawing Sheets

METHOD OF MANUFACTURING LIQUID EJECTION HEAD AND METHOD OF PROCESSING SUBSTRATE

BACKGROUND OF THE INVENTION

1. Field of the Invention

The present invention relates to a method of manufacturing a liquid ejection head and also to a method of processing a substrate.

2. Description of the Related Art

Silicon substrates are typically employed for ink jet printing type liquid ejection heads and a plurality of heating resistors are arranged in rows on the substrate along with a heat storage layer and an electrically insulating layer provided so as to be common to the heating resistors.

Known configurations of liquid ejection head include the one disclosed in U.S. Pat. No. 6,273,557. The liquid ejection head disclosed in U.S. Pat. No. 6,273,557 includes minute ejection ports for ejecting liquid droplets, a flow channel communicating with the ejection ports and an ejection energy generating section provided at a part of the flow channel, which are arranged on a substrate. Additionally, a liquid supply port that communicates with the flow channel is formed on the silicon substrate.

U.S. Pat. No. 6,534,247 describes a method of forming such a liquid supply port by subjecting a silicon substrate to a two-step etching process. (See Specification and FIGS. 5 and 6 of U.S. Pat. No. 6,534,247). With the method described in the above patent document, a liquid supply port is formed by subjecting a substrate to the first etching step that is a crystal anisotropic etching step and then to the second etching step that is a dry etching (reactive ion etching).

SUMMARY OF THE INVENTION

According to the present invention, there is provided a method of manufacturing a liquid ejection head including a substrate having an ejection energy generating element formed at a first surface side thereof to generate energy for ejecting liquid, a common liquid chamber formed at a second surface side of the substrate that is the side opposite to the first surface side and a liquid supply port extending from the bottom of the common liquid chamber to the first surface side, the method including:

(1) a step of preparing the substrate having the common liquid chamber formed at the second surface side;

(2) a step of arranging a material to be filled in the common liquid chamber;

(4) a step of forming an aperture in the filled material as corresponding to a liquid supply port to be formed; and (5) a step of forming the liquid supply port by reactive ion etching, using at least the filled material as a mask;

to be executed in the above listed order.

According to the present invention, there is also provided a method of processing a substrate including; a step of preparing a substrate having a recess at a second surface side thereof, a step of arranging a material to be filled in the recess, a step of forming an aperture in the filled material and etching the substrate from the bottom of the recess by reactive ion etching, using the filled material having the aperture as a mask.

Further features of the present invention will become apparent from the following description of exemplary embodiments with reference to the attached drawings.

DESCRIPTION OF THE EMBODIMENTS

Figure 1:
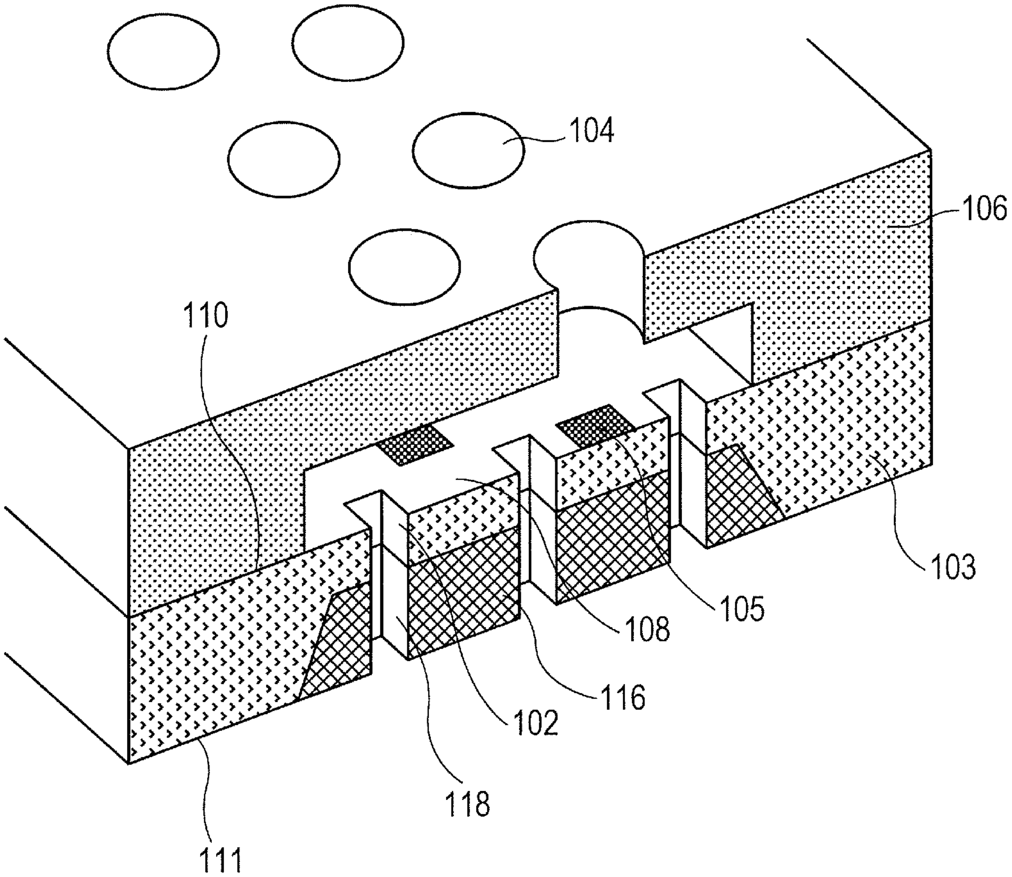
FIG. 1 is a partially cutaway schematic perspective view of a liquid ejection head that is still on the way of being manufactured by a manufacturing method according to an embodiment of the invention, illustrating an exemplar configuration of the liquid ejection head.

Preferred embodiments of the present invention will now be described in detail in accordance with the accompanying drawings.

Reactive ion etching, which is a dry etching technique, using the Bosch process is a known technique of forming a liquid supply port in a liquid ejection head. With reactive ion etching using the Bosch process, silicon is etched by repeating formation of a deposition film (to be referred to as a depo-film hereinafter) for the purpose of protecting the side wall, removal of the depo-film on the bottom surface by ions, and removal of silicon by radicals. However, when forming a liquid supply port by etching a substrate having a common liquid chamber at the bottom surface of the common liquid chamber by means of reactive ion etching, a plasma sheath is formed so as to trace the shape of the common liquid chamber. Therefore, ions are influenced at and near the side wall of the common liquid chamber to remove the depo-film at positions displaced from the desired positions toward the direction of the side wall of the common liquid chamber. Since the positions at which the depo-film is removed are displaced at and near the side wall of the common liquid chamber in the above described manner, the positions of etching by means of radicals are also slightly displaced to give rise to a phenomenon that the etching operation consequently proceeds with an angle of several degrees. This phenomenon will be referred to as tilt hereinafter. Thus, there arises a tilt phenomenon in which the aperture of the etching starting part and the aperture of the etching terminating part are displaced to a large extent at a liquid supply port formed near the side wall of the common liquid chamber in an operation of forming the liquid supply port that communicates with a first surface (front surface) of the substrate. Such a tilt phenomenon can cause damage to the nearby wiring section. Additionally, as the tilt phenomenon occurs, the liquid supply port itself is formed obliquely to make the size of the aperture of the liquid supply port vary from a substrate to another. Then, as a result, the liquid supply performance may vary among substrates and there may be a substrate in which a liquid supply port has no aperture at all. To solve this problem, an arrangement of forming no supply port near the side wall of the common liquid chamber by securing a large aperture region for the common liquid chamber relative to the region for forming a liquid supply port may be conceivable. However, such an arrangement reduces the region for installation and can give rise to head separation and/or color mixing in installation. On the other hand, if a common liquid chamber is formed after forming a liquid supply port, the liquid supply port can lose its shape.

In view of the above-identified problems of the prior art, therefore, an object of the present invention is to provide a method of manufacturing a liquid ejection head that can form a liquid supply port with high-precision aperture positions by making the bottom of the common liquid chamber of the substrate capable of being perpendicularly etched. The above identified problems can occur not only when manufacturing a liquid ejection head but also when etching a substrate from the bottom surface of a recess thereof by reactive ion etching. Thus, another object of the present invention is to provide a method of processing a substrate that can highly precisely etch a substrate at the time of etching the substrate from the bottom surface of a recess by reactive ion etching.

Now, a preferred embodiment of the present invention will be described below by referring to the accompanying drawings.

FIG. 1 is a schematic perspective view of a liquid ejection head in the process of being manufactured by the manufacturing method of the present embodiment. The liquid ejection head illustrated in FIG. 1 includes a substrate 103 that may typically be a silicon substrate and has a first surface (to be also referred to as a front surface) 110 and a second surface (to be also referred to as a back surface) 111 and a nozzle plate 106 formed on the first surface of the substrate. An ejection energy generating element 105 is formed on the first surface of the substrate 103. A liquid flow channel 108 that is to be filled with liquid to be ejected is also formed at the first surface side of the substrate.

A common liquid chamber is provided at the second surface side of the substrate and a material to be filled therein 116 is arranged in the common liquid chamber. A mask pattern (having patterned apertures) 118 is provided in the filled material 116. With this embodiment, liquid supply ports 102 for supplying liquid to the liquid flow channel 108 are formed by using the mask pattern 118 in the filled material 116 so as to make the liquid supply ports 102 run through the substrate from the bottom of the common liquid chamber.

Nozzles 104 (to be also referred to as ejection ports) for ejecting liquid are formed in the nozzle plate 106 so as to communicate with the liquid flow channel 108. The nozzle plate 106 may typically be formed by sequentially laying a plurality of resin layers on the substrate.

FIGS. 2A through 2E schematically illustrate a liquid ejection head in different manufacturing steps so as to illustrate the manufacturing method of this embodiment.

Figure 2A:
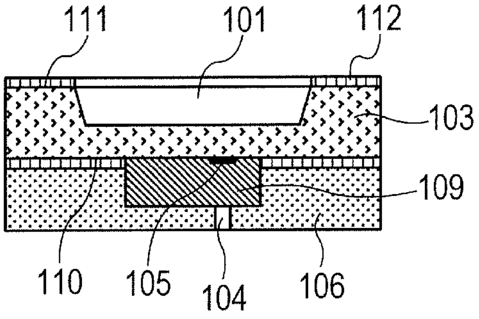
FIGS. 2A, 2B, 2C, 2D and 2E are schematic cross-sectional views of the liquid ejection head, illustrating different manufacturing steps of the manufacturing method according to the embodiment.

As illustrated in FIG. 2A, a substrate 103 that has a first surface 110 and a second surface 111 that is the surface opposite to the first surface is prepared. An ejection energy generating element 105 is arranged at the first surface side of the substrate 103. A mold member (to be also referred to as a flow channel mold member) 109 that is to be used as a mold for the liquid flow channel is arranged on the first surface and a nozzle plate 106 is arranged to cover the mold member 109. Nozzles 104 are formed in the nozzle plate 106.

A common liquid chamber 101 is formed at the second surface side of the substrate 103. FIG. 2A denotes a first etching mask 112 for defining the aperture position of the common liquid chamber. The common liquid chamber is a recess typically formed from the second surface side by crystal anisotropic etching. In other words, a recess is formed at the second surface side of the substrate.

Figure 2D:
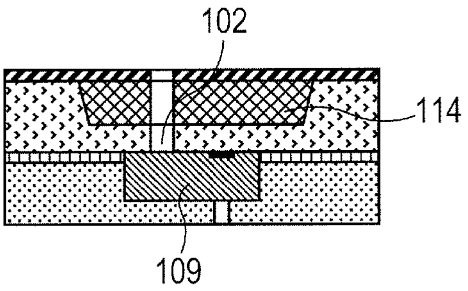
Figure 2B:
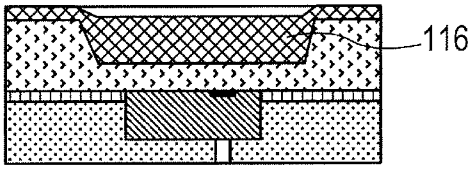

Then, as illustrated in FIG. 2B, the first etching mask 112 on the second surface is removed and subsequently a material to be filled 116 is arranged in the common liquid chamber 101.

Any material that can be flattened and patterned may be used for the material to be filled. In other words, the material may an organic material or an inorganic material. However, the material to be filled is particularly preferably a resin material. Examples of resin material include photosensitive resin materials including positive type photosensitive resin resists and negative type photosensitive resin resists, although positive type photosensitive resin resist may preferably be used for the purpose of the present invention. Examples of inorganic materials include silicon carbide and silicon nitride.

The technique of arranging the material to be filled is not particularly limited. For example, the material to be filled can be arranged in the common liquid chamber by coating or spraying.

Then, a step of flattening the filled material 116 is preferably conducted. For example, the filled material 116 arranged in the common liquid chamber 101 is flattened so as to make its surface flush with the second surface of the substrate 103. Note, however, this step may not necessarily be conducted. In other words, the influence of the sheath can be suppressed by arranging the material to be filled in the common liquid chamber (recess), although the filled material may preferably be flattened in order to more completely suppress the influence of the sheath.

At least either the filled material 116 or the second surface (of the substrate 103) is etched so as to make the surface of the filled material 116 and the second surface flush with each other. While the etching technique is not subjected to any limitations, at least either the filled material or the second surface is polished by chemical mechanical polishing (CMP). Alternatively, the filled material can be flattened without exposing the second surface of the substrate by arranging the material to be filled 116 so as to cover the second surface and then polishing only the filled material.

While the material to be filled 116 is arranged in the common liquid chamber and on the second surface in the description given above by referring to FIG. 2A, the present invention is not limited to such an arrangement. The common liquid chamber may not necessarily be completely filled with a material so long as, after filling the material, the filled material is so etched as to make its surface flush with the second surface of the substrate. The depth of the common liquid chamber may preferably be appropriately determined. With this embodiment, the height of the filled material (the depth of the common liquid chamber) is preferably between 500 and 600 μm when the filled material is flattened.

Figure 2E:
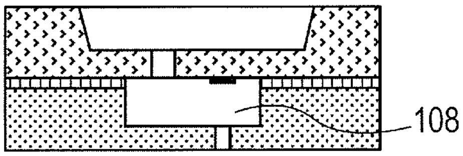
Figure 2C:
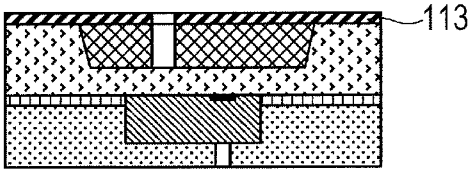

Then, the second etching mask 113 is formed on the flattened second surface and subsequently the filled material 116 is patterned by using the second etching mask 113, as illustrated in FIG. 2C. As a result, patterned apertures (a mask pattern) that match the liquid supply ports to be formed are formed in the filled material 116. After the patterning operation, the filled material 116 operates as a mask for forming the liquid supply ports (to be also referred to as a third etching mask).

A dry etching technique may typically be employed as the etching technique for patterning the filled material 116. Preferably, the dry etching technique is reactive ion etching. When a photosensitive resin material is employed for the material to be filled, a photolithography process may be used for patterning the filled material.

Then, as illustrated in FIG. 2D, the liquid supply port 102 is formed by means of reactive ion etching, using the filled and patterned material 114 as mask. When processing the substrate, the substrate is etched from the bottom surface of the recess by reactive ion etching. In this process, the influence of the distortion, if any, of the plasma sheath can be reduced as a result of arranging the material to be filled. The influence of the distortion of the plasma sheath can be suppressed further when the filled material is flattened.

The Bosch process is preferably employed for the reactive ion etching.

Then, after forming the liquid supply port 102, the filled material 114 is removed as illustrated in FIG. 2E. Then, the liquid flow channel 108 is formed by removing the mold member 109.

Both the mold member 109 and the filled material 116 can be removed at the same time when the same material is used for them. Thus, the process can be simplified typically by using the same positive type resist material for both the mold member 109 and the material to be filled 116.

Finally, whenever appropriate, a liquid ejection head can be produced by separating a silicon wafer into each unit chip form by means of a dicer.

EXAMPLE 1

An exemplar process flow of the manufacturing method according to the embodiment will be described below by referring to FIGS. 3A through 3G.

Figure 3A:
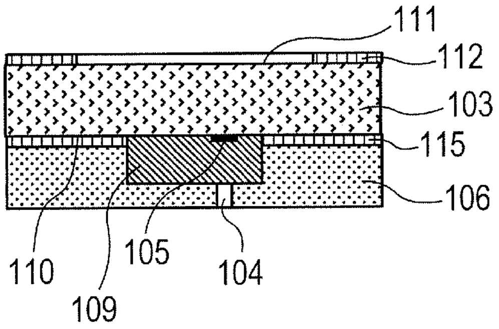
FIGS. 3A, 3B, 3C, 3D, 3E, 3F and 3G are schematic cross-sectional views of the liquid ejection head of Example 1 in different manufacturing steps.

Firstly, as illustrated in FIG. 3A, a silicon substrate 103 provided on the first surface 110 thereof with an ejection energy generating element 105 was prepared. An adhesion improving layer 115 that was made of a resin material was formed on the silicon substrate 103 by patterning by way of a photolithography process. Additionally, the first etching mask 112 was formed on the second surface 111 by using the same resin material. A mold member 109 was formed on the silicon substrate 103 and a nozzle plate 106 that had nozzles 104 therein was formed so as to cover the mold member 109.

Figure 3E:
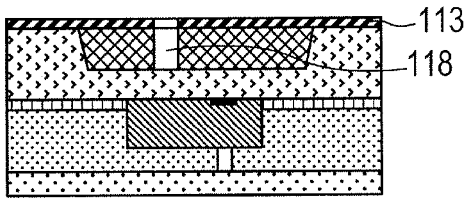
Figure 3B:
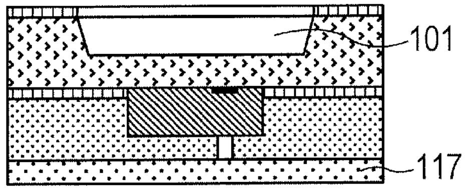

Then, as illustrated in FIG. 3B, a protection film 117 was applied in order to protect the nozzle plate and other components against alkali solution. Thereafter, the silicon substrate was immersed in a 22 WT % solution of tetramethyl ammonium hydroxide (TMAH) at 83° C. for 12 hours to form a common liquid chamber 101 at the second surface. The remaining silicon (the thickness from the bottom surface of the common liquid chamber to the first surface) is preferably between 100 and 200 μm, for instance, and was actually 150 μm in this example.

Figure 3F:
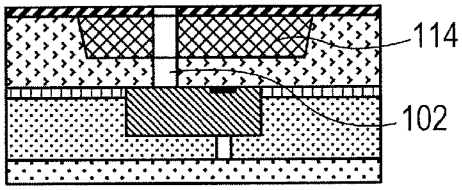
Figure 3C:
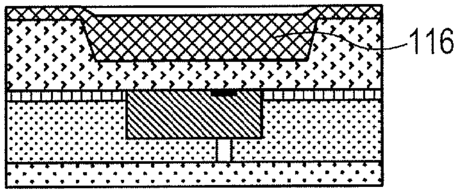

Thereafter, the first etching mask 112 and the thermal oxide film layer (not illustrated) that had been formed on the second surface were removed, as illustrated in FIG. 3C. Subsequently, the material to be filled 116 was applied to the common liquid chamber 101.

The material to be filled is preferably a resin based material, more preferably a positive type resist material. Examples of positive type resist materials include ODUR-1010 (tradename, commercially available from TOKYO OHKA KOGYO CO., LTD.)

In this example, a positive type resist material was employed for the material to be filled.

As illustrated in FIG. 3C, the material to be filled 116 was arranged in the common liquid chamber 101 and on the second surface.

Figure 3G:
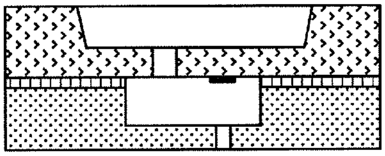
Figure 3D:
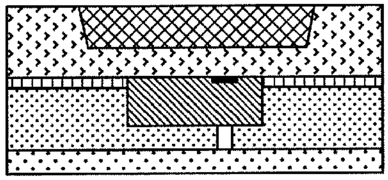

Then, as illustrated in FIG. 3D, the filled material was polished from the top surface thereof until the second surface of the substrate became exposed. Thereafter, a washing operation was conducted.

Preferably, the polishing conditions including the pressure, the number of revolutions per unit time and the polishing liquid (alumina, silica or the like) were finely tuned in order to prevent or suppress scratches (micro scars) and dishing (undulations) that can be produced as a result of polishing so that the polishing operation may be conducted in optimum conditions.

Thereafter, as illustrated in FIG. 3E, the second etching mask 113 was formed on the second surface 111 and the filled material 116 for the purpose of patterning the filled material.

A metal film that had been prepared by plating was used as the material of the second etching mask 113. More specifically, the metal film was subjected to a photolithography process to produce the second etching mask 113 by patterning.

Then, an etching operation was conducted on the filled material. The second etching mask was used as the mask for the etching operation to produce the mask pattern 118 for forming the liquid supply port in the filled material 116. The Bosch process was employed and the etching operation was a dry etching operation in this example.

Subsequently, as illustrated in FIG. 3F, the Bosch process was conducted for another time for a dry etching operation of forming the liquid supply port 102, using the filled material 114, in which the mask pattern 118 had been formed while maintaining the flatness of the second surface, as mask (to be also referred to as the third etching mask). $SF_6$ gas was used as etching gas and $C_4F_8$ gas was used as coating gas for the etching operation.

Thereafter, as illustrated in FIG. 3G, the substrate was immersed in xylene to remove the protection film. Then, the mold member and the filled material were removed by way of the aperture of the liquid supply port.

Subsequently, the liquid ejection head was produced by separating a silicon wafer into each unit chip form by means of a dicer.

EXAMPLE 2

An exemplar process flow of the manufacturing method according to the embodiment will be described below by referring to FIGS. 4A through 4G.

Figure 4A:
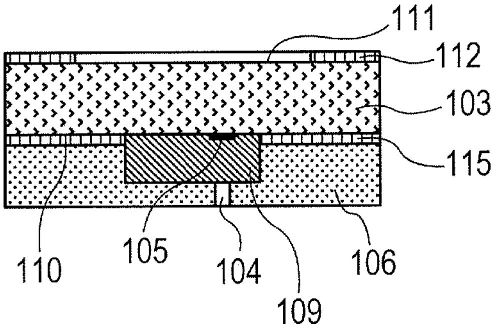
FIGS. 4A, 4B, 4C, 4D, 4E, 4F and 4G are schematic cross-sectional views of the liquid ejection head of Example 2 in different manufacturing steps.
Figure 4E:
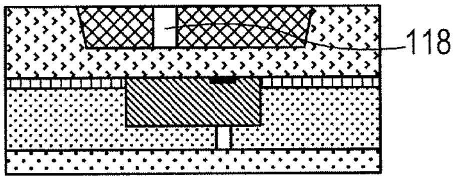
Figure 4B:
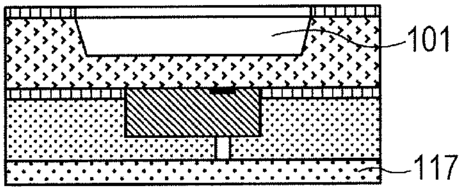
Figure 4F:
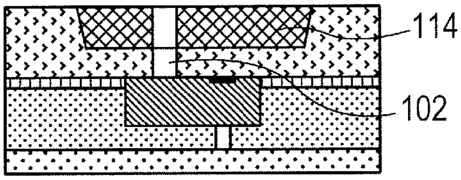
Figure 4C:
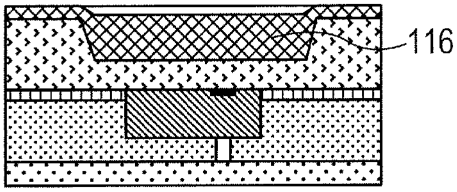
Figure 4G:
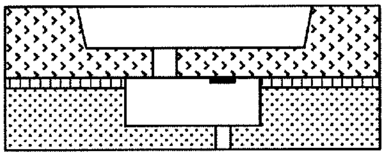
Figure 4D:
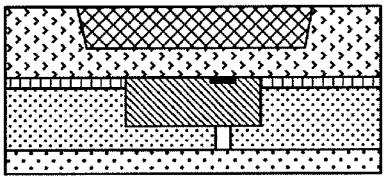

The process of this example was the same as that of Example 1 except that a high-sensitive resist material used for X-ray lithography was used as the material to be filled instead of the photosensitive resin material in the step illustrated in FIG. 4C. The same members as those of FIGS. 3A through 3G were denoted by the same reference symbols. In the step illustrated in FIG. 4E, a pattern that showed a high verticality could be formed in the filled material, which had been arranged to a relatively large thickness, by means of a lithography technique using X-rays.

Thus, with the manufacturing method according to the present invention, a liquid supply port can be formed while suppressing the influence of ions and reducing the tilt.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-029377, filed Feb. 14, 2012, and Japanese Patent Application No. 2013-007103, filed Jan. 18, 2013, which are hereby incorporated by reference herein in their entirety.

What is claimed is:

1. A method of manufacturing a liquid ejection head comprising a substrate having an ejection energy generating element formed at a first surface side thereof to generate energy for ejecting liquid, a common liquid chamber formed at a second surface side of the substrate that is a side opposite to the first surface side and a liquid supply port extending from a bottom of the common liquid chamber to the first surface side, the method comprising, in listed order:

(1) a step of preparing the substrate having the common liquid chamber formed at the second surface side;

(2) a step of arranging a material to be filled in the common liquid chamber;

(4) a step of forming an aperture in the filled material as corresponding to the liquid supply port to be formed by means of a dry etching technique, using a metal film as a mask for etching the filled material; and (5) a step of forming the liquid supply port by means of a dry etching technique, using at least the filled material having the aperture as a mask.

2. The method according to claim 1, wherein the material to be filled is a resin material.

3. The method according to claim 1, further comprising:

(3) a step of flattening the filled material between the material arranging step and the aperture forming step.

4. The method according to claim 3, wherein a flat surface is formed by the filled material and a second surface of the substrate, which is at the second surface side, after the step of flattening the filled material.

5. The method according to claim 1, wherein the material to be filled is a photosensitive resin material.

6. The method according to claim 5, wherein the photosensitive resin material is a positive type resist material.

7. The method according to claim 5, wherein the aperture is formed by means of a photolithographic technique in the aperture forming step.

8. The method according to claim 1, wherein the dry etching technique in the liquid supply port forming step is reactive ion etching.

9. The method according to claim 8, wherein the dry etching technique in the liquid supply port forming step is executed by using a Bosch process.

10. The method according to claim 1, further comprising a step of removing the filled material after the liquid supply port forming step.

11. The method according to claim 10, wherein:

the liquid ejection head additionally has at the first surface side of the substrate a nozzle plate having therein an ejection port for ejecting liquid and a liquid flow channel communicating with the ejection port;

the method further comprises a step of forming on a first surface of the substrate, which is at the first surface side, a flow channel mold member operating as a mold for forming the liquid flow channel; and the same material is used for the filled material and the flow channel mold member so as to allow both the filled material and the flow channel mold member to be removed simultaneously after the liquid supply port forming step.

12. A method of processing a substrate comprising, in listed order:

a step of preparing a substrate having a recess at a second surface side thereof;

a step of arranging a material to be filled in the recess; and a step of forming an aperture in the filled material by means of a dry etching technique, using a metal film as a mask for etching the filled material, and etching the substrate from a bottom of the recess by means of reactive ion etching, using the filled material having the aperture as a mask, wherein the filled material and a second surface of the substrate, which is at the second surface side, produce a flat surface as a result of a step of flattening the filled material.

* * * * *